Nov. 12, 1940.  W. R. WILEY  2,221,124
CLIP
Filed Oct. 6, 1939

INVENTOR
William R. Wiley.
BY
Harness, Dickey & Pierce.
ATTORNEYS.

Patented Nov. 12, 1940

2,221,124

UNITED STATES PATENT OFFICE 2,221,124

CLIP

William R. Wiley, Birmingham, Mich.

Application October 6, 1939, Serial No. 298,294

5 Claims. (Cl. 189—88)

The present invention relates to improved clip constructions of the type particularly adapted to secure moldings to supporting panel members, such as the panel members of automobile bodies.

One of the primary objects of the present invention is to provide improved clips of the type mentioned which are adapted to extend through apertures in a panel member and have means thereon for covering such apertures so that a leak-proof combination is provided.

Another object of the invention is to provide improved clip constructions of the type mentioned having novel molding engaging means and also having novel panel engaging means associated therewith.

Another object of the invention is to provide an improved clip construction of the type mentioned having novel molding engaging means whereby the clip may be readily inserted into the molding by a turning movement.

Another object of the invention is to provide an improved clip construction of the type mentioned having a novel molding engaging portion by which the molding may be snapped over the molding engaging means and is securely held in position.

Other objects of the invention will become apparent from the following specification, the drawing relating thereto and the claims hereinafter set forth.

In the drawing, in which like numerals are used to designate like parts in the several views throughout:

Figure 1:
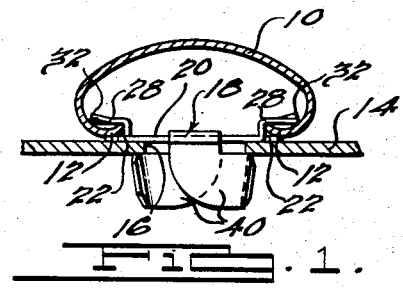
Figure 1 is a fragmentary, vertical cross-sectional view illustrating a molding secured to a supporting panel by means of one form of clip embodying features of the present invention.
Figure 2:
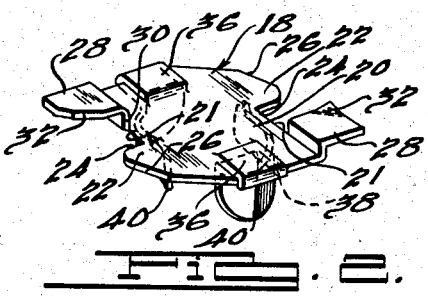
Fig. 2 is a perspective view of the clip illustrated in Fig. 1.
Figure 3:
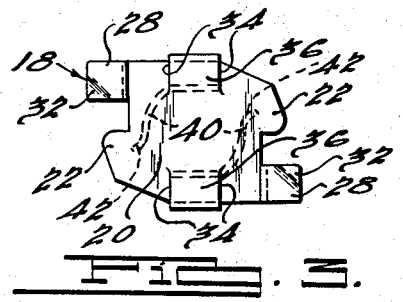
Fig. 3 is a top plan view of the clip illustrated in Fig. 2.
Figures 4, 5:
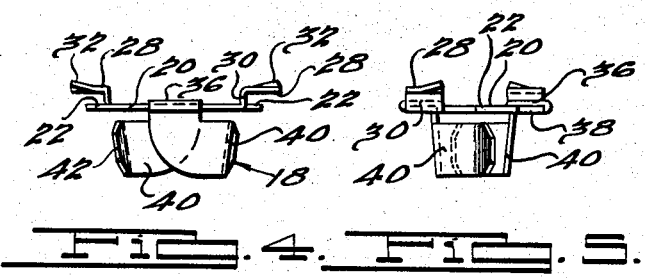
Fig. 4 is a side elevational view of the clip illustrated in Fig. 2.
Fig. 5 is an end elevational view of the clip illustrated in Fig. 2.

Referring to the drawing, and referring particularly to Figs. 1 through 5 thereof, a sheet metal, channel shaped molding strip 10 is illustrated having inturned edges 12. It is, of course, to be understood that the strip 10 is elongated in shape and is adapted to be attached to a sheet metal panel 14, such as one of the body panels of an automobile, at spaced intervals along its length. The panel 14 is provided with a plurality of spaced openings or apertures 16, which in the embodiment illustrated are circular, along the line which the molding strip 10 is designed to occupy when in position.

The clips forming the subject matter of the present invention are preferably formed of a single integral sheet metal stamping made from relatively high carbon steel, which, after being formed, is heat treated or otherwise tempered in order that it will have the resiliency and ruggedness necessary in clips of the type herein described.

The molding 10 is securely mounted to the panel 14 by means of clips generally indicated at 18, which are formed of the material treated as above mentioned, and which engage the molding 10 and panel 14 through apertures 16. Each clip 18 comprises a flat plate-like portion 20 which is of greater area than the area of aperture 16 so that the portion 20 extends beyond the confines of the aperture and serves as a cover to provide a leak-proof construction when the elements are assembled.

In order to secure the clip to the molding 10, the plate-like portion 20 is provided with a pair of oppositely disposed recesses 21 providing oppositely directed projections 22 having straight portions 24 and tapered portions 26. The projections 22 are adapted to engage the under surfaces of the flanges 12 of the molding; and cooperating elements are provided in the form of projections 28 which are spaced from the projections 22 by upturned portions 30 integral with the edge of recess 21 so that the projections 28 are substantially parallel to their cooperating projections 22. That corner of each projection 28 which faces the projection 22 is turned up slightly as indicated at 32 so that a cam surface is provided to facilitate engagement of the projection 28 with flange 12 of the molding.

The clip 18 is secured to the molding 10 by a turning movement in that the clip is first positioned relative to the flanges 12 of the molding so that the projections 22 underlie the flanges and the projections 28 overlie the flanges. By then turning the clip, the cam surface 32 engages the inner edge of flange 12, and as the turning of the clip continues, the flanges 12 are securely held between the projections 22 and 28. The clip is thus securely fixed to the molding 10.

In order to secure the clip 18 to the panel 14, panel engaging elements are formed integral with the plate-like portion 20. Such panel engaging elements are formed at opposite positions on the plate member 20 and are formed by providing slits or slots 34 through the opposite edges of the portion 20. Such portions are then offset upwardly out of the plane of portion 20 to provide top portions 36. The panel engaging elements are then reversely turned upon themselves to provide under portions 38 which lie within the plane of portion 20.

The ends of the panel engaging elements are then curved and turned so that the upper edges thereof are spaced from the under surface plate-like portion 20 a distance substantially equal to the thickness of panel 14, as best seen in Figures 1 through 4. The turned ends are indicated at 40 and such ends 40 have the extreme tips thereof slightly curved outwardly as indicated at 42 in Figure 3. The ends 40 are also twisted slightly so that the surfaces thereof converge downwardly and inwardly generally in the form of a cone. The purpose of this convergence is to facilitate the insert of the panel engaging elements through the apertures 16 in that the outer surfaces of such elements act as cam surfaces to first force these resilient elements inwardly as such elements are passed through the aperture 16. When the elements 40 have been passed through such aperture, they will then resiliently snap outwardly to their normal position, as indicated in Figure 1, to lock the clips to the panel. The top surface of the panel is engaged by the under surface of portion 20 and the under surface of panel 14 is engaged by the top edge of resilient elements 40. Such elements 40 must be collapsed toward each other before the clip can be removed from the panel.

As best illustrated in Figure 1, it will be seen that the aperture 16 is completely covered by the cover portion 20 of the clip so that a leakproof combination is provided.

Figure 6:
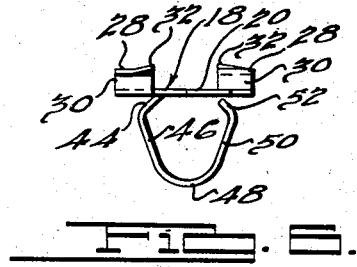
Fig. 6 is a view similar to Fig. 5, illustrating another form of such clip having modified panel engaging means thereon.
Figure 7:
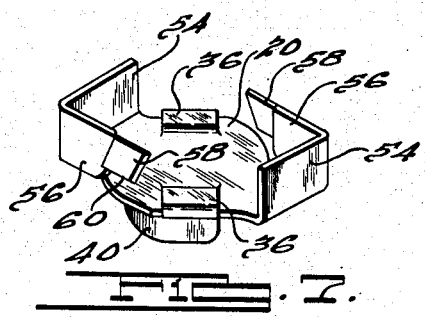
Fig. 7 is a perspective view of a modified form of clip construction.
Figure 8:
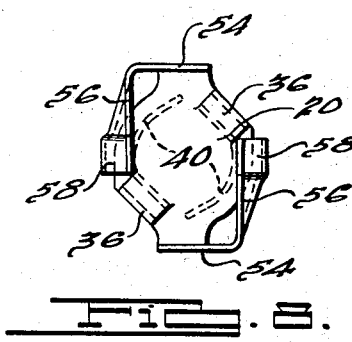
Fig. 8 is a top plan view of the clip shown in Fig. 7.
Figures 9, 10:
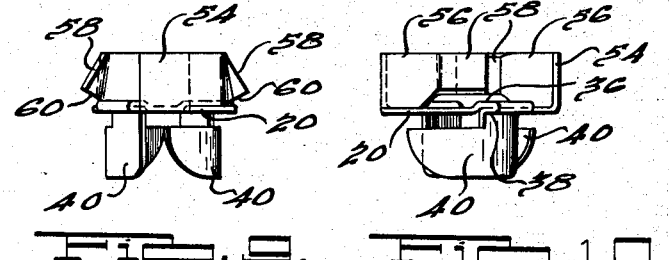
Fig. 9 is an end elevational view of the clip illustrated in Fig. 7.
Fig. 10 is a side elevational view of the clip illustrated in Fig. 7.

In Figure 6, a modified form of panel engaging means is provided on the clip described above. Such panel engaging means includes an elongated strip which is integral with the plate-like portion 20 and which is bent to provide a shoulder portion 44 which diverges downwardly and outwardly, an adjacent downwardly converging portion 46, a nose 48, an upwardly and outwardly diverging portion 50, and an upwardly and inwardly converging portion 52. The elongated element is resilient so that the nose portion 48 first passes through the aperture 16 and the portions 46 and 50 engage the edge of aperture 16 to resiliently collapse the panel engaging element. When the clip is in its normal position with respect to the panel 14, the edge of the aperture is engaged by shoulder portions 44 and 52, and the clip is thereby fixed with respect to the panel 14.

Referring to Figures 7 through 10, a modified form of clip construction is illustrated in which the molding engaging means are of a different character than that illustrated above in connection with Figures 1 through 5. The cover portion and the panel engaging means are, however, the same as in the embodiment described above in Figures 1 through 5.

In this embodiment of the invention, the molding engaging means include oppositely disposed, elongated elements having upstanding portions 54 which are integral with the plate-like portion 20. Such portions 54 lie in planes substantially normal to the plane of plate member 20 and have free resilient ends 56 which are turned toward each other at substantially right angles to their respective portions 54. The facing ends of portions 58 are reduced and are turned to provide top surfaces which converge upwardly away from plate-like portion 20 and lower edges 60 which are spaced from plate-like portions 20. The under edges 60 thus provide cam edges which engage the top edges of flanges 12 in molding 10 to secure such molding against panel 14. The molding 10 may be snapped over the ends 58 of the resilient attaching elements 56 so that such flanges 12 are positioned under the ends 58 that are engaged by edges 60.

Figure 11:
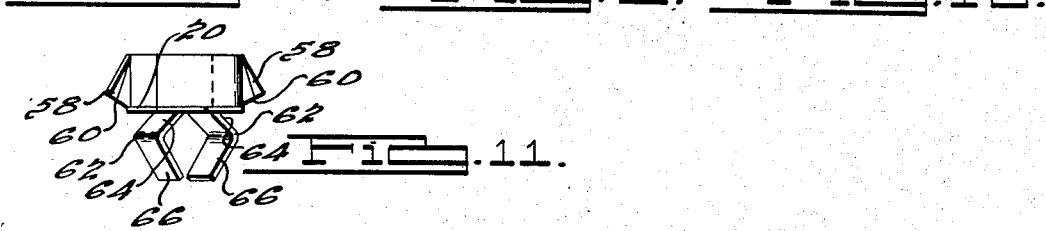
Fig. 11 is a view similar to Fig. 9 illustrating such clip with a modified form of panel engaging means thereon.

In this embodiment of the invention, the plate-like portion 20 also is of a greater area than the aperture 16 so that it serves as a cover for such aperture. In Figure 11, a modified form of clip is illustrated in which the plate-like portion 20 and the molding engaging means are the same as those illustrated above in connection with Figures 7 through 10 but in which another form of panel engaging elements is illustrated. Such panel engaging elements include a pair of depending legs 62 which are positioned side-by-side and which are shaped to provide shoulder portions 64, diverging downwardly from cover portion 20. The ends of the legs are then bent to converge inwardly as indicated at 66 so that the legs 62 are sprung toward each other as they are inserted in apertures 16 and then spring outwardly as the edges of such aperture engage the shoulder portions 64. Such shoulder portions thereby force the panel 16 against the under surface of cover portion 20 and fix the clip with respect to the panel and, therefore, fix the molding 10 with respect to the panel which is engaged by the molding engaging elements.

Formal changes may be made in the specific embodiment of the invention described without departing from the spirit and substance of the invention, the scope of which is commensurate with the appended claims.

What is claimed is:

1. In combination, a channel shaped molding member, a supporting panel having an aperture therein, and a clip for securing said molding to said panel, said clip including a plate-like portion covering said aperture, projections formed on said portion and lying in substantially the same plane thereof, other projections integral with said portion and spaced from said first named projections, said projections cooperating to form molding engaging means receiving portions of said molding therebetween, and means disposed on the opposite side of said portion engaging said panel.

2. In combination, a channel shaped molding member having inturned flanges, a supporting panel having an aperture therein, and a clip for securing said molding to said panel, said clip including a plate-like portion covering said aperture, a pair of oppositely directed projections formed on opposite edges of said portion and lying in substantially the same plane thereof is another pair of oppositely directed projections formed on opposite edges of said portion and lying in a plane spaced from the plane of said portion, each of said last named projections cooperating with one of said first named projections and being laterally spaced therefrom to provide molding engaging means adapted to receive therebetween said inturned flanges, and means disposed on the opposite side of said portion engaging said panel.

3. In combination, a channel shaped molding member, a supporting panel having an aperture therein, and a clip for securing said molding to said panel, said clip including a cover portion extending beyond the confines of said aperture and engaging said panel, means disposed on one side of said portion engaging said molding, and means disposed on the opposite side of said portion extending through said aperture, said last named means including elongated elements turned and curved so that the top edges thereof lie in spaced relation to the under surface of said portion and so that said top edges engage the under surface of said panel.

4. In combination, a channel shaped molding member, a supporting panel having an aperture therein, and a clip for securing said molding to said panel, said clip including a cover portion extending beyond the confines of said aperture and engaging said panel, means disposed on one side of said portion engaging said molding, and means disposed on the opposite side of said portion extending through said aperture, said last named means including elongated, resilient elements turned and curved so that the top edges thereof lie in spaced relation to the under surface of said portion and so that said top edges engage the under surface of said panel, said elements also being turned so that the surfaces thereof converge away from said cover portion.

5. In combination, a channel shaped molding member having inturned flanges, a supporting panel having an aperture therein, and a clip for securing said molding to said panel, said clip including a cover portion having portions thereof engaging one side of said panel and extending beyond the confines of said aperture, oppositely disposed upstanding portions integral with said cover portion, each of said last named portions having resilient free ends extending toward each other, the extremities of said ends being turned to provide cam portions which engage said inturned flanges and secure said clip with respect to said molding, and means disposed on the opposite side of said portion extending through said aperture engaging said panel.

WILLIAM R. WILEY.